Patented Jan. 4, 1938

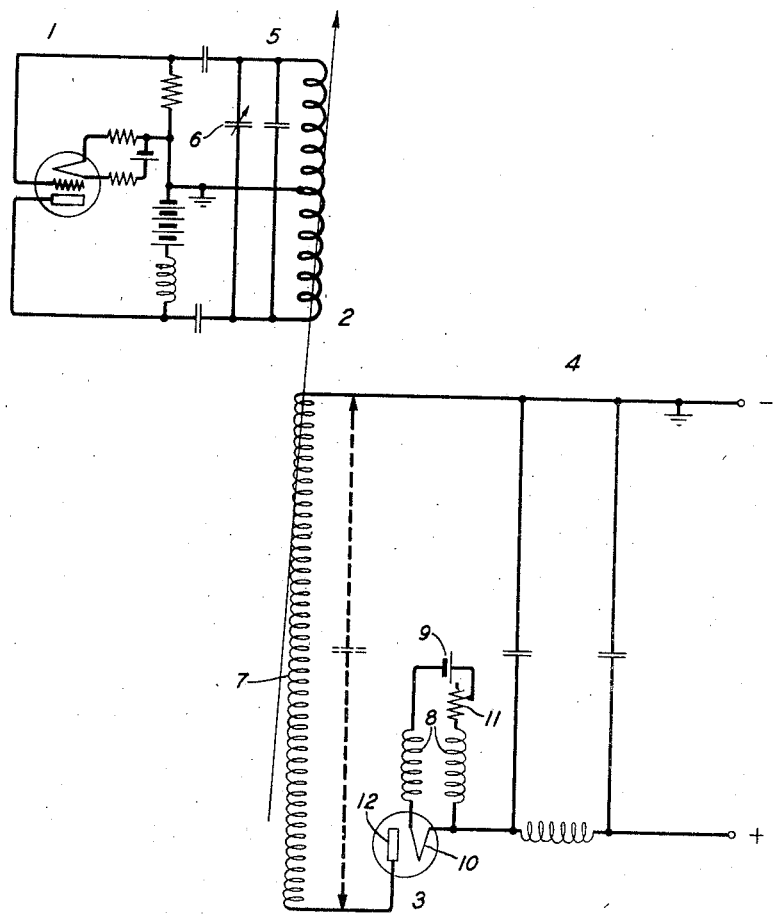

2,104,463

UNITED STATES PATENT OFFICE 2,104,463

SOURCE OF VARIABLE HIGH DIRECT POTENTIAL

John B. Johnson, Millburn, N. J., and Fred W. Kammerer, New York, N. Y., assignors to Bell Telephone Laboratories, Incorporated, New York, N. Y., a corporation of New York Application July 6, 1936, Serial No. 89,082

6 Claims. (Cl. 175—363)

This invention relates to a source of variable, high, direct potential and especially to such a source as is adapted for use with a minimum of hazard, on account of the high potential, to an operator.

An object of the invention is to achieve a continuously variable high direct potential in the most efficient and economical manner as to mass, space, cost, portability and simplicity.

Another, and perhaps the most important, object of the invention is to achieve a high, direct potential with a minimum of hazard from the high potential.

A plausible alternative to the invention would be the use of a combination of unit direct potential generators so related as to achieve an overall potential which is large as compared with that of each unit generator. In general such a generating system would not have the attributes pointed out in the above objects. A closer approximation, in the prior art, comprehends the use of a storing system, in the form of a filter, to which is supplied successive charges of current from a rectifier. Such a system, while containing certain essential ingredients of the present invention, as practiced in the prior art where the frequency of charging has been that common to house circuits or at least not comparable with that employed in the present invention, would not have the qualities of applicants' generator, because of the large storing capacity required. Also because of the lack of this significant low storage capacity, both per se and as affecting other characteristics of the generator, such a system would not have the safety attributes of applicants' generator. Nor does the prior art, as exhibited thereby, illustrate applicants' simple and convenient means for continuously varying the resultant high direct potential or an alternative means as effective as applicants' means.

The present system, that is, the continuously variable source of high direct potential of applicants' invention, uses a filter of low storage capacity fed by a rectifier from a high frequency wave source of continuously variable frequency as the prime source for the eventual achievement of the desired type of direct potential. The alternating potential therefrom is transformed to a potential corresponding to the desired eventual high direct potential and the transformed product is transmitted through a resonant circuit adjusted preferably to operate between maximum and minimum resonance with respect to the frequency of the wave from the prime source and is then rectified and filtered to remove the ripple components, the resultant potential being a direct potential as resulting from the rectifying and filtering operation. A predetermined high potential is determined by the order of voltage transformation, and it is made continuously variable by reason of the corresponding frequency variation of the prime alternating potential as transformed to a corresponding amplitude, that is, potential variation, by playing across the resonant circuit.

The safety feature results not only from the use of low storage capacity per se, but also from the use of the high frequency which, within easily attainable limits, and without substantial sacrifice of other qualities, may be made great enough to introduce the so-called "skin" effect and so render the circuit, as to its alternating current potential component, safe for that reason. It results also from the rapid degree of detuning and therefore poor voltage regulation when the body of a subject is effectively interposed in the generating circuit as a whole, this following particularly from the high frequency selective quality of the resonant circuit.

A better understanding of the exact nature and object of the invention will be afforded by the following more detailed description when taken with the drawing, the single figure of which illustrates schematically a circuit which embodies the principle of the invention in an effective form.

Referring now to the drawing, the reference numerals 1, 2, 3 and 4 refer, respectively, to the prime alternating potential source, transformer, rectifier and filter of the system as already briefly described.

The prime source 1 is disclosed as a Hartley type oscillator, otherwise completely disclosed in Hartley Patent 1,356,763, October 26, 1920, although it is immaterial, so far as concerns the invention, as to the type of prime alternating potential source to be used so long as it is capable of generating a potential of adequate frequency which frequency may be caused to continuously vary. The use of a source of relatively small power is favored as conducing to greater safety. In a circuit of applicants' invention which has been found effective in practice, an average frequency of about 885 kilocycles was used. As is well known the frequency of the particular type of oscillator here chosen for illustration is determined by a resonant circuit such as circuit 5 of the figure, the inductance of which, in the particular instance illustrated, constitutes the primary winding of the voltage step-up transformer 2. The variable condenser 6 is an element of this resonant circuit and makes possible a continuous variation of frequency of the generated wave.

The degree of frequency variation is dependent on the resonant characteristics of the tuned circuit which is used as a means for transforming such frequency variation into a corresponding potential variation. This tuned (that is, resonant) circuit, is constituted by the secondary winding 7 of the transformer 2 when taken with its distributed capacitance. The dash line showing of a condenser connected across this winding is intended to illustrate the effect of this distributed capacitance as constituting, with the inductance provided by the secondary winding 7, an effective tuned circuit. The range of frequency should be sufficient to encompass substantially the whole frequency-impedance characteristic curve for this imputed tuned circuit. The narrower the characteristic, that is, the more selective this tuned circuit, the more sensitive the variation of resultant potential will be in proportion to the corresponding change in frequency, and also the poorer the voltage regulation of the circuit as a whole as effected by this element upon the interposition in the circuit of an operator's body to effectively vary the frequency with relation thereto. These considerations would conduce to the use of as great a selectivity as possible. The relation of the number of turns of the two windings is dependent on the desired, or necessary, voltage step-up having in mind the eventual desired direct potential. The couplings between the windings of the transformer are preferably made variable as illustrated both in the interest of effective energy transfer, that is, having in mind the purity of the resultant wave, etc. and the utility of this means as a further means for varying the resultant direct potential. In a practical embodiment the primary winding has consisted of a few turns of wire wound on a dielectric, plastic, core with the secondary winding constituted by a much greater number of turns, perhaps extending several inches in length, and wound on the same core, with provision for a relative movement of one or both of the windings on the core in order to vary the coupling. In said embodiment the optimum spacing between contiguous ends of the two windings was a matter of a fraction of an inch. The described and illustrated type of high frequency transformer provides the desired low coupling. If the type of transformer which is more common at low frequencies, comprising windings superposed on a common core, were used, it would be difficult to obtain a low enough coupling or coupling coefficient to avoid the double humped resonant characteristic, which would be detrimental to the most efficient operation of the circuit.

The transformed wave or potential is impressed on the rectifier 3. A thermionic high vacuum type of tube is most suitable for this rectifier. Its cathode 10 is energized by direct current source 9 through a variable resistance 11 and inductance coils 8. These inductance coils effectively isolate the space path of the rectifier, with respect to the applied alternating potential, from said cathode energizing circuit. The end of the secondary transformer winding which is furthest from the coupled end is connected to the anode 12 of the rectifier. This connection results in a greater output than the alternative connection since this end of the coil, with the ground connections as shown, has the least capacity to ground. If the connection were made to the opposite end of the secondary winding or, which would amount to about the same thing, if the opposite end were placed closer to ground, an additional load would be placed across the secondary winding.

The filter may be of the simple type shown, the particular electrical design being relatively uncritical but dependent generally on the particular type of wave resulting from the rectification. It is highly significant, however, that because of the high frequency used, of the order of 885 kilocycles in a practical embodiment of the invention, it is practicable to employ filter elements of very different character than if a different order of frequency were used. This is particularly true as to the size and storage capacity of the elements, both inductors and capacitors. In the above practical embodiment, the capacitance of each of the condensers was of the order of .002 microfarads and the inductance of the coil had a value of about 30 millihenries. The terminals of the circuit, adjacent the filter, and marked with plus and minus signs in the drawing, indicate the point at which the high direct potential source of the invention may be connected to associate circuits. That is, the continuously variable high direct potential which it is the object of the invention to achieve, is existent between these two points.

The operation of the invention has already been briefly pointed out. The output wave of the prime source 1 is transformed to a potential such that when rectified and filtered, there will be the requisite high direct potential, this potential being varied by varying the frequency of the prime wave with relation to the resonant frequency of the tuned circuit constituted by the secondary winding 7 and its distributed capacity, the resultant rectified wave being smoothed by the filter 4 and because of the small storage capacity of the filter element there is not a sufficient source of energy to injure an operator any part of whose body is inadvertently connected across any part of the circuit. This is true regardless of the value of the high, direct potential. Because of the interposition of the highly selective tuned circuit between the prime source and the rectifier, such interposition of the force of the operator's body which results in such a detuning, that is, change of frequency of the prime oscillator as would deflect the frequency from the optimum frequency characteristic of said tuned circuit would act so as to immediately reduce the potential to an innocuous value. Also, consistently with the appropriate relative design of all of the elements of the circuit with regard to the features and characteristics that have been described, the average frequency of the wave from the prime source is high enough to significantly introduce the so-called "skin" effect and therefore insure an insufficient penetration of the current to cause injury to an operator whose body is inadvertently interposed in the circuit.

Also it is possible by means of the circuit of the invention to vary the direct potential by varying the transformer coupling though this would tend to alter the regulation and therefore, possibly to some extent, the safety factor.

What is claimed is:
1. The method of generating a direct potential comprising the steps of generating a wave, rectifying said wave, and filtering out the ripple components of the resultant wave, the filter reactive elements being chosen such that while preserving for the filter its desired frequency-pass characteristic their storage capacities are insufficient to permit said direct potential, however large, to inflict bodily injury on a subject any part of whose body is interposed in the circuit.

2. The method of generating a continuously variable direct potential which comprises the steps of generating a wave, varying the frequency thereof, converting said variation of frequency into a corresponding variation of potential by transmitting the wave through a circuit tuned to an intermediate frequency in the range of frequency variations, and rectifying said wave.

3. A source of high, direct potential comprising in combination, a wave source, a step-up transformer, a rectifier and a filter-like means for smoothing the resultant rectified wave, the voltage step-up as achieved by said transformer being predetermined by the desired ultimate direct potential in the output circuit of the filter means, and the reactive elements of said filter-like means having such electrical dimensions while preserving for said means its desired frequency-pass characteristic as to insure storage capacities so small that the resultant direct potential, however large, may not inflict bodily injury on an operator, any part of whose body is interposed in the circuit.

4. Means for generating a continuously variable direct potential comprising in combination, means for generating a wave, means for continuously varying the frequency thereof, means for converting said variation of frequency into a corresponding variation of alternating potential comprising a tuned circuit in the energy flow path of said wave the resonant frequency of which is comprised within the range of frequency variation of said wave, and means for rectifying the resulting wave to produce the desired direct potential.

5. The combination specified in the next preceding claim including additionally a filter means subsequent to said rectifier for eliminating the ripple components of the rectified wave, and a voltage transformer between the wave source and the rectifier for stepping-up the potential to that corresponding to the desired eventual direct potential, the frequency of the wave from said source being so high in relation to the acuteness of the resonant characteristic of said tuned circuit and the small storage capacities of the reactive elements of the filter corresponding to said frequency, that said resultant direct potential, however large, is incapable of inflicting bodily injury on an operator any part of whose body is interposed in the circuit.

6. A direct potential source comprising in combination, a prime wave source, rectifier and filter, said wave source embodying means for insuring a continuous and smooth variation of the resultant direct potential, said means being adapted to vary the frequency of the waves from said prime source.

JOHN B. JOHNSON.
FRED W. KAMMERER.